US012712689B2

(12) United States Patent
Svendsen et al.

(10) Patent No.: US 12,712,689 B2
(45) Date of Patent: Aug. 18, 2026

(54) SYNCHRONIZATION SIGNAL BLOCK BEAM SWEEP ENABLED DIRECTIONAL REPEATER

(71) Applicant: Nokia Technologies Oy, Espoo (FI)

(72) Inventors: Simon Svendsen, Aalborg (DK); Christian Rom, Aalborg (DK); Samantha Caporal Del Barrio, Aalborg (DK); Benny Vejlgaard, Aalborg (DK); Ali Karimidehkordi, Munich (DE); Morten Toft, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 324 days.

(21) Appl. No.: 18/579,407

(22) PCT Filed: Jul. 15, 2021

(86) PCT No.: PCT/EP2021/069729
§ 371 (c)(1),
(2) Date: Jan. 15, 2024

(87) PCT Pub. No.: WO2023/284962
PCT Pub. Date: Jan. 19, 2023

(65) Prior Publication Data

US 2024/0322986 A1 Sep. 26, 2024

(51) Int. Cl.
*H04L 5/00* (2006.01)
*H04B 7/185* (2006.01)
(Continued)

(52) U.S. Cl.
CPC ....... *H04L 5/0048* (2013.01); *H04B 7/18519* (2013.01); *H04L 5/0094* (2013.01);
(Continued)

(58) Field of Classification Search
CPC ... H04L 5/0094; H04L 5/0007; H04L 5/0048; H04B 7/18519; H04B 7/0617; H04B 7/15507; H04W 74/0833; H04W 56/0015
See application file for complete search history.

(56) References Cited

U.S. PATENT DOCUMENTS 11,838,151 B1 * 12/2023 Jones .................. H04L 25/0224
2019/0053120 A1 * 2/2019 Park .................... H04W 36/305
(Continued)

*Primary Examiner* — Michael K Phillips
(74) *Attorney, Agent, or Firm* — Carter, DeLuca & Farrell LLP

(57) ABSTRACT

Systems, methods, apparatuses, and computer program products for a synchronization signal block beam sweep enabled smart meter. A method may include receiving information on an allocation of a plurality of synchronization signal blocks from a network element. One or more synchronization signal blocks may be received from the network element. The one or more synchronization signal blocks may be configured with corresponding random access channel opportunities. The one or more synchronization signal blocks may be repeated in specific angular directions. A correct synchronization signal block beam may be configured at a correct time based on the random access channel opportunities. An indication may be received from the network element of which user equipment within a sector of a repeater element has connected on which random access channel opportunities.

1 Claim, 9 Drawing Sheets

(51) Int. Cl.

| | |
|---|---|
| ***H04W 74/0833*** | (2024.01) |
| *H04B 7/06* | (2006.01) |
| *H04B 7/155* | (2006.01) |

(52) U.S. Cl.

CPC ....... *H04W 74/0833* (2013.01); *H04B 7/0617* (2013.01); *H04B 7/15507* (2013.01)

(56) References Cited

U.S. PATENT DOCUMENTS

| | | | | |
|---|---|---|---|---|
| 2019/0159258 | A1* | 5/2019 | Islam | H04W 56/0005 |
| 2020/0112360 | A1* | 4/2020 | Krunz | H04B 7/086 |
| 2020/0322949 | A1* | 10/2020 | Akkarakaran | H04L 5/0094 |
| 2021/0067237 | A1* | 3/2021 | Sampath | H04W 74/0833 |
| 2021/0235283 | A1* | 7/2021 | Abedini | H04W 74/002 |
| 2021/0235501 | A1* | 7/2021 | Abedini | H04B 7/088 |
| 2022/0053433 | A1* | 2/2022 | Abedini | H04L 5/0023 |
| 2022/0174509 | A1* | 6/2022 | Noh | H04W 56/001 |
| 2022/0369366 | A1* | 11/2022 | Zhang | H04W 74/002 |
| 2022/0417880 | A1* | 12/2022 | Priyanto | H04W 56/0015 |
| 2024/0063867 | A1* | 2/2024 | Yang | H04L 5/0051 |

* cited by examiner

SYNCHRONIZATION SIGNAL BLOCK BEAM SWEEP ENABLED DIRECTIONAL REPEATER

RELATED APPLICATION

This application was originally filed as PCT Application No. PCT/EP2021/069729, filed on Jul. 15, 2021, of which is incorporated herein by reference in its entirety.

FIELD

Some example embodiments may generally relate to mobile or wireless telecommunication systems, such as Long Term Evolution, LTE, or fifth generation, 5G, radio access technology or new radio, NR, access technology, or other communications systems. For example, certain embodiments may relate to apparatuses, systems, and/or methods for a synchronization signal block beam sweep enabled smart meter.

BACKGROUND

Examples of mobile or wireless telecommunication systems may include the Universal Mobile Telecommunications System (UMTS) Terrestrial Radio Access Network, UTRAN, Long Term Evolution, LTE, Evolved UTRAN, E-UTRAN, LTE-Advanced, LTE-A, MulteFire, LTE-A Pro, and/or fifth generation, 5G, radio access technology or new radio (NR) access technology. 5G wireless systems refer to the next generation, NG, of radio systems and network architecture. 5G is mostly built on a new radio, NR, but the 5G (or NG) network can also build on E-UTRAN radio. It is estimated that NR will provide bitrates on the order of 10-20 Gbit/s or higher, and will support at least enhanced mobile broadband, eMBB, and ultra-reliable low-latency-communication, URLLC, as well as massive machine type communication, mMTC. NR is expected to deliver extreme broadband and ultra-robust, low latency connectivity and massive networking to support the Internet of Things, IoT. With IoT and machine-to-machine, M2M, communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include receiving information on an allocation of a plurality of synchronization signal blocks from a network element. The method may also include receiving one or more synchronization signal blocks from the network element. The one or more synchronization signal blocks may be configured with corresponding random access channel opportunities. The method may further include repeating the one or more synchronization signal blocks in specific angular directions. In addition, the method may include configuring a correct synchronization signal block beam at a correct time based on the random access channel opportunities. Further, the method may include receiving from the network element, an indication of which user equipment within a sector of a repeater element has connected on which random access channel opportunities.

Other example embodiments are directed to an apparatus that may include at least one processor and at least one memory including computer program code. The at least one memory and the computer program code are configured, with the at least one processor to cause the apparatus at least to receive information on an allocation of a plurality of synchronization signal blocks from a network element. The apparatus may also be caused to receive one or more synchronization signal blocks from the network element. The one or more synchronization signal blocks may be configured with corresponding random access channel opportunities. The apparatus may further be caused to repeat the one or more synchronization signal blocks in specific angular directions. In addition, the apparatus may be caused to configure a correct synchronization signal block beam at a correct time based on the random access channel opportunity. Further, the apparatus may be caused to receive from the network element, an indication of which user equipment within a sector of a repeater element has connected on which random access channel opportunities.

Other example embodiments are directed to an apparatus. The apparatus may include means for receiving information on an allocation of a plurality of synchronization signal blocks from a network element. The apparatus may also include means for receiving one or more synchronization signal blocks from a network element. The one or more synchronization signal blocks may be configured with corresponding random access channel opportunities. The apparatus may further include means for repeating the one or more synchronization signal blocks in specific angular directions. In addition, the apparatus may include means for configuring a correct synchronization signal block beam at a correct time based on the random access channel opportunities. Further, the apparatus may include means for receiving from the network element, an indication of which user equipment within a sector of a repeater element has connected on which random access channel opportunities.

In accordance with other example embodiments, a non-transitory computer readable medium may be encoded with instructions that may, when executed in hardware, perform a method. The method may include receiving information on an allocation of a plurality of synchronization signal blocks from a network element. The method may also include receiving one or more synchronization signal blocks from the network element. The one or more synchronization signal blocks may be configured with corresponding random access channel opportunities. The method may further include repeating the one or more synchronization signal blocks in specific angular directions. In addition, the method may include configuring a correct synchronization signal block beam at a correct time based on the random access channel opportunities. Further, the method may include receiving from the network element, an indication of which user equipment within a sector of a repeater element has connected on which random access channel opportunities.

Other example embodiments may be directed to a computer program product that performs a method. The method may include receiving information on an allocation of a plurality of synchronization signal blocks from a network element. The method may also include receiving one or more synchronization signal blocks from the network element. The one or more synchronization signal blocks may be configured with corresponding random access channel opportunities. The method may further include repeating the one or more synchronization signal blocks in specific angular directions. In addition, the method may include configuring a correct synchronization signal block beam at a correct time based on the random access channel opportunities. Further, the method may include receiving from the network element, an indication of which user equipment within a sector of a repeater element has connected on which random access channel opportunities.

Other example embodiments may be directed to an apparatus that may include circuitry configured to receive information on an allocation of a plurality of synchronization signal blocks from a network element. The apparatus may also include circuitry configured to receive one or more synchronization signal blocks from the network element. The one or more synchronization signal blocks may be configured with corresponding random access channel opportunities. The apparatus may further include circuitry configured to repeat the one or more synchronization signal blocks in specific angular directions. In addition, the apparatus may include circuitry configured to configure a correct synchronization signal block beam at a correct time based on the random access channel opportunity. Further, the apparatus may include circuitry configured to receive from the network element, an indication of which user equipment within a sector of a repeater element has connected on which random access channel opportunities.

Certain example embodiments may be directed to a method. The method may include informing a repeater element of an allocation of a plurality of synchronization signal blocks. The method may also include transmitting one or more synchronization signal blocks to a repeater element. The one or more synchronization signal blocks may be configured with corresponding random access channel opportunities. The method may further include informing the repeater element of which user equipment within a sector of the repeater element has connected on the random access channel opportunities.

Other example embodiments may be directed to an apparatus. The apparatus may include at least one processor and at least one memory including computer program code. The at least one memory and computer program code may be configured to, with the at least one processor, cause the apparatus at least to inform a repeater element of an allocation of a plurality of synchronization signal blocks. The apparatus may also be caused to transmit one or more synchronization signal blocks to a repeater element. The one or more synchronization signal blocks may be configured with corresponding random access channel opportunities. The apparatus may further be caused to inform the repeater element of which user equipment within a sector of the repeater element has connected on the random access channel opportunities.

Other example embodiments may be directed to an apparatus. The apparatus may include means for informing a repeater element of an allocation of a plurality of synchronization signal blocks. The apparatus may also include means for transmitting one or more synchronization signal blocks to a repeater element. The one or more synchronization signal blocks may be configured with corresponding random access channel opportunities. The apparatus may further include means for informing the repeater element of which user equipment within a sector of the repeater element has connected on the random access channel opportunities.

In accordance with other example embodiments, a non-transitory computer readable medium may be encoded with instructions that may, when executed in hardware, perform a method. The method may include informing a repeater element of an allocation of a plurality of synchronization signal blocks. The method may also include transmitting one or more synchronization signal blocks to a repeater element. The one or more synchronization signal blocks may be configured with corresponding random access channel opportunities. The method may further include informing the repeater element of which user equipment within a sector of the repeater element has connected on the random access channel opportunities.

Other example embodiments may be directed to a computer program product that performs a method. The method may include informing a repeater element of an allocation of a plurality of synchronization signal blocks. The method may also include transmitting one or more synchronization signal blocks to a repeater element. The one or more synchronization signal blocks may be configured with corresponding random access channel opportunities. The method may further include informing the repeater element of which user equipment within a sector of the repeater element has connected on the random access channel opportunities.

Other example embodiments may be directed to an apparatus that may include circuitry configured to inform a repeater element of an allocation of a plurality of synchronization signal blocks. The apparatus may also include circuitry configured to transmit one or more synchronization signal blocks to a repeater element. The one or more synchronization signal blocks may be configured with corresponding random access channel opportunities. The apparatus may further include circuitry configured to inform the repeater element of which user equipment within a sector of the repeater element has connected on the random access channel opportunities.

BRIEF DESCRIPTION OF THE DRAWINGS

For proper understanding of example embodiments, reference should be made to the accompanying drawings, wherein:

FIG. 2(*a*) illustrates an example DR configuration in downlink (DL).

FIG. 2(*b*) illustrates an example DR configuration in uplink (UL).

FIG. 6(*b*) illustrates another example SSB configuration, according to certain example embodiments.

FIG. 10(*b*) illustrates another apparatus, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for a synchronization signal block beam sweep enabled smart meter.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments. Further, the phrase "based on" may indicate a condition and/or situation. For example, "based on" may mean "if", and "based on" may be interchangeable with the conditional word "if".

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

A type of network node is a radio frequency (RF) repeater. RF repeaters have been used in various telecommunication deployments including, for example, 2G, 3G and 4G. RF repeaters may have independent paths for reception and transmission, and may amplify or regenerate data signals in order to transfer telecommunication signals from one terminal to another. They may constitute a cost-effective way to improve network coverage by providing the capability of amplifying and reconstructing a signal so that it can be sent over a longer distance than would be possible without the repeater. In general, RF repeaters may be bidirectional amplifiers that, when located between two antennas, relay signals in remote locations, or in order to bypass obstructed paths. However, a disadvantage is that they may amplify signal and noise and, thus, may contribute to an increase of interference (pollution) in the system.

Figures 1, 2A, 2B:
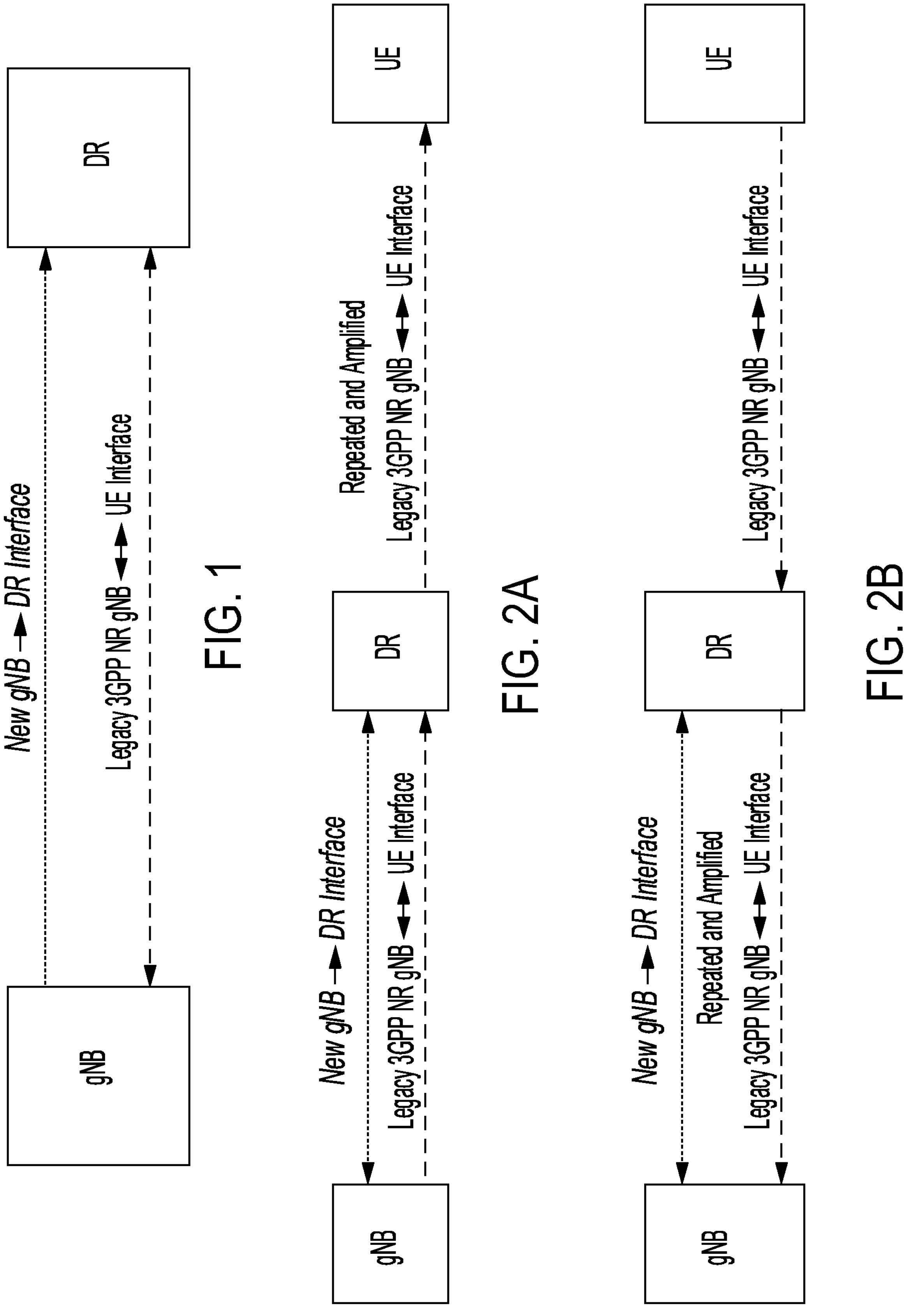
FIG. 1 illustrates an example interface between a gNB and a directional repeater (SR).

A traditional RF repeater may not be able to support the required beam management for NR FR2 devices and a new interface between the next generation node-B (gNB) and the repeater is envisioned to enable a repeater to handle beam management to a directional repeater (DR) as illustrated in FIG. 1. In particular, FIG. 1 illustrates an example interface between a gNB and a directional repeater (DR). In some cases, DR may have certain access coverage/performance advantages over RF repeaters offered by having side control information to selectively apply amplify-and-forward relay operation. This assumes the availability of timing information (i.e., slot and symbol uplink/downlink (UL/DL) configuration), and transmitter and receiver spatial information (i.e., beam information).

A DR may be required to receive, amplify, and transmit legacy NR FR2 signals in order to keep the timing and make it transparent towards the connected UEs, but also to keep the hardware (HW) cost and complexity at a minimum. It is expected (assumption for the 1st generation DR, 3GPP Rel-18/19) that a DR may be able to receive additional control information from the gNB. For example, FIG. 2(*a*) illustrates an example DR configuration where the DR acts as a RF repeater for legacy 3GPP NR gNB<->UE interface in DL, and FIG. 2(*b*) illustrates an example DR configuration where the DR acts as a RF repeater for legacy 3GPP NR gNB<->UE interface in UL. In some cases, the new gNB->SR control interface may be embedded in legacy 3GPP NR gNB<->UE interface, and decoded at the DR or even as a new air interface.

In view of the above, certain example embodiments may enable a DR to reuse the current 3GPP Rel-15 specified SSB sweeping procedure with a modification to perform a separate SSB beam sweep in the sector covered by the DR, and still allow legacy UEs to connect to either the gNB or the DR.

Figures 3, 4:
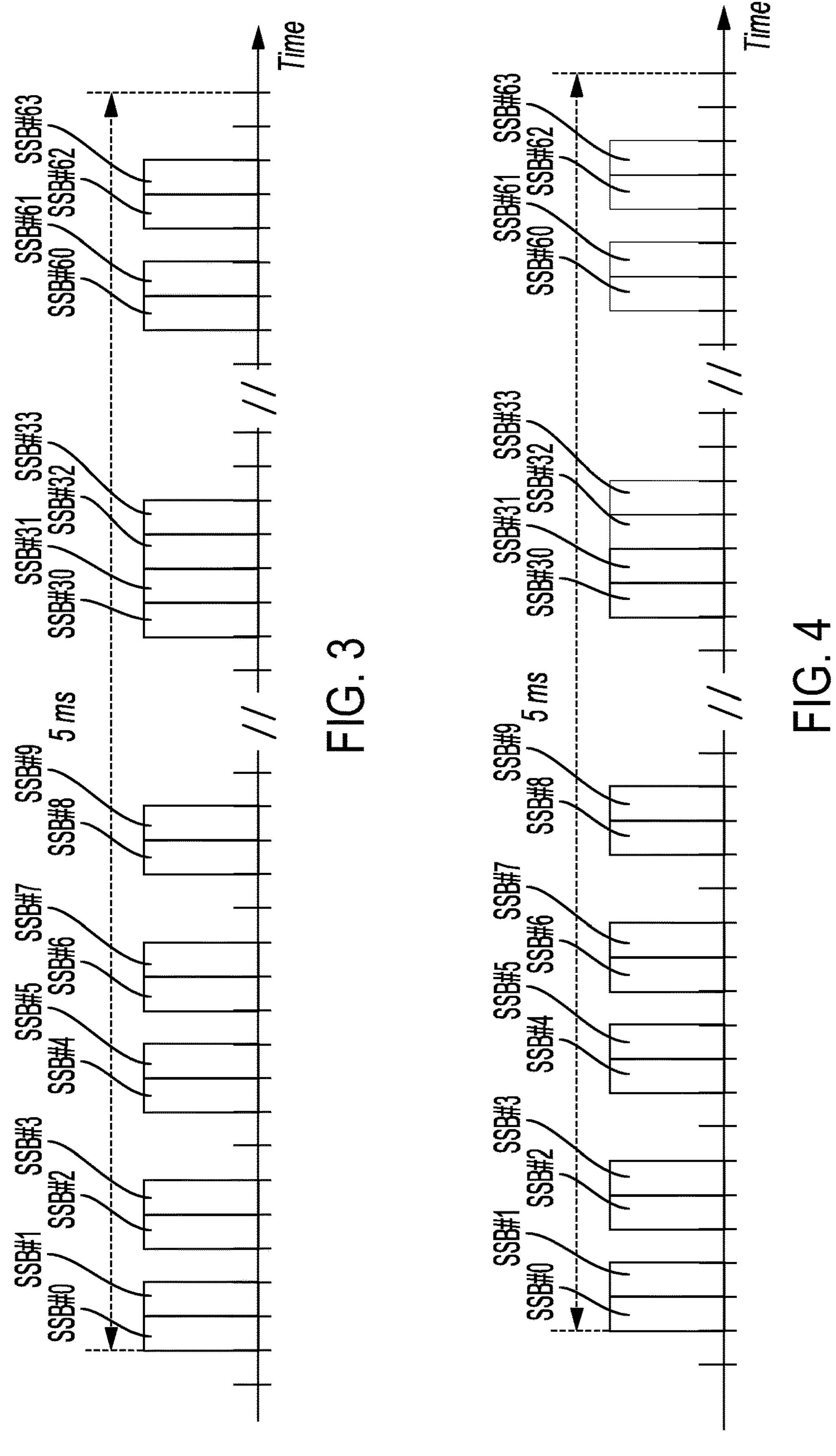
FIG. 3 illustrates an example full (64) synchronization signal block (SSB) structure.
FIG. 4 illustrates example reduced (32) SSB structure.

FIG. 3 illustrates an example full (64) SSB structure as defined in NR 3GPP Rel-15. As illustrated in FIG. 3, the SSB sequence may be specified and fixed for different implementations of sub-carrier-spacings (SCS). For example, for FR2 (SCS=120 kHz or 240 kHz), a 64 SSB sequence may be defined, communicated, and known to each UE in the initial access procedure via a master information block (MIB).

FIG. 4 illustrates an example reduced (32) SSB structure as defined in NR 3GPP Rel-15. As illustrated in FIG. 4, a gNB operating at FR2 frequencies may not be required to utilize all of the allocated 64 SSB bursts, and may be configured to a lower number, such as for example 32 SSBs per burst. Such a down scaling may also be communicated to the UEs via system information block 1 (SIB1), and the remaining SSBs may be in principle not utilized. However, the connected UEs may still know the resource allocation of these remaining SSBs even though they are not used.

Figure 5:
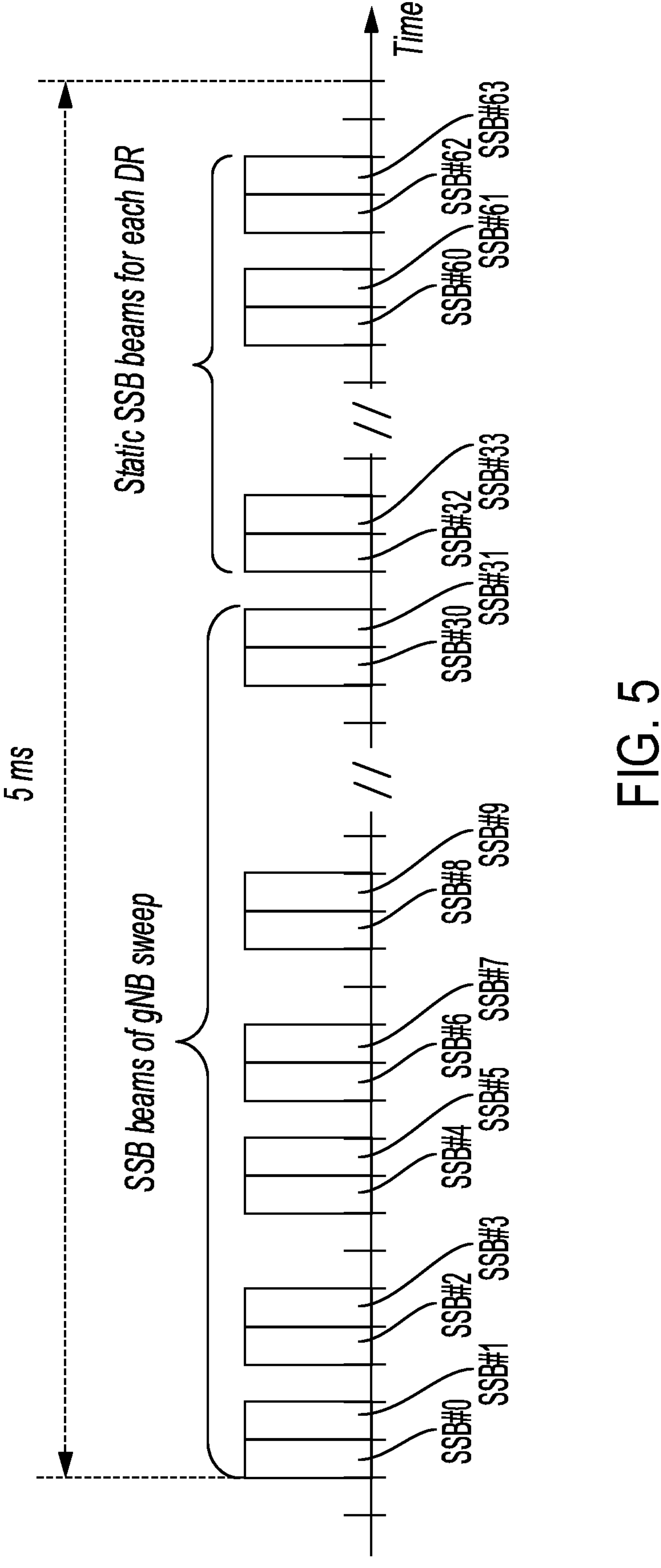
FIG. 5 illustrates an example reduced (32) SSB structure, according to certain example embodiments.
Figure 6A:
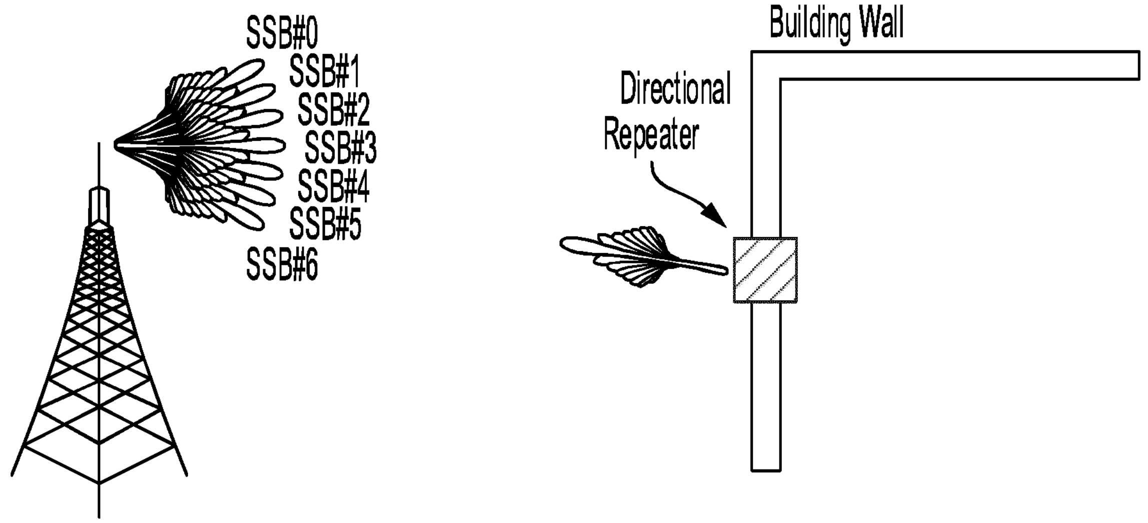
FIG. 6(*a*) illustrates an example SSB configuration, according to certain example embodiments.
Figure 6B:
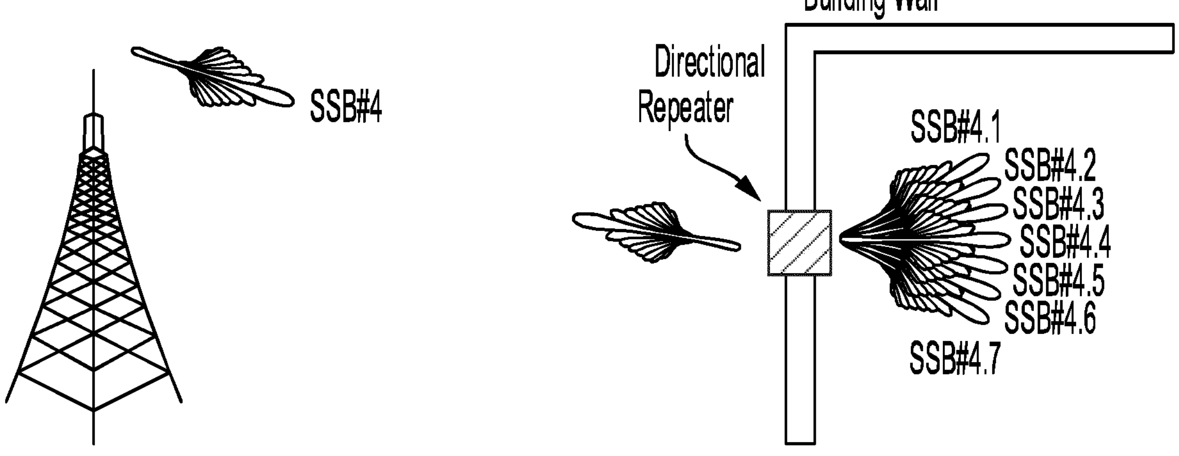

FIG. 5 illustrates an example reduced (32) SSB structure, according to certain example embodiments. As illustrated in FIG. 5, certain example embodiments may enable the DR to utilize the same gNB transmitted SSBs within the area covered by the DR. Further, FIG. 6(*a*) illustrates an example SSB configuration for a DR using legacy gNB SSB beam sweeping, according to certain example embodiments. In particular, FIG. 6(*a*) illustrates the first part (SSB #0 to SSB #31) used for legacy beam sweeping within the sector covered by the gNB, and may be ignored by the DR. However, FIG. 6(*b*) illustrates another example SSB configuration for a DR using DR SSB beam sweeping, according to certain example embodiments. In particular, FIG. 6(*b*) illustrates the second part (SSB #32 to SSB #38) where the second part may be partly targeted for one or more DRs, and may be transmitted with the same beam at the gNB directed toward the specific DRs (i.e., the best gNB SSB beam reported by each DR (SSB #4 in this example). For instance, in some example embodiments, the best gNB SSB beam may correspond to the SSB beam from the legacy sweep (SSB #0 to SSB #31) that was received with the highest reference signal received power (RSRP), signal-to-noise ratio (SNR), and/or signal-to-noise and interference ratio (SINR). According to certain example embodiments, the DR may use the allocated 7 repeated SSB #4 beams (SSB #32 to SSB #38) to perform a SSB sweep within the sector covered by the DR.

In certain example embodiments, the repeated SSB beam may be configured with different random access channel (RACH) opportunities (RO), and/or different sets of preambles, using for example, ra-PreambleStartIndex. Both implementations may use different SSB resource block indicators (SSBRIs) in order for the UE within the sector of the DR to identify the best SSB and transmit preamble at the correct time for initial access (IA), or report the specific SSB index when radio resource control (RRC). As such, SSB #4.1 in FIG. 6(*b*) may actually be seen as resource index SSB #32.

According to certain example embodiments, the SSB structure may be divided into different configurations, which may be controlled by the gNB and communicated to the devices via gNB broadcast messages. Furthermore, a UE located within the sector of the gNB and that has SSB #4 as the best SSB beam, may in this case receive multiple SSB #4 beams within the SS burst, which could be an issue if the UE and/or gNB are not aware of this. Additionally, a UE performing IA may react on the RO assigned to each SSB beam. Thus, a UE selecting a RO of a beam intended for a DR may just use that RO for RACH. That same RO may also be used by a UE performing IA at the same time in the sector covered by the SRDR which may increase the risk of contention as both UEs could select the same preamble. However, that can also happen with the traditional IA for two UEs covered by the same SSB beam.

A UE in RRC may report all x best SSB beams as SSB #4 for example, whereby the gNB may not know any alternative SSB beams for beam management. This may be controlled at the gNB by informing the UE in its sector, via RRC, that they should only use the 32 first SSBs for beam management. The command to be used for this may be ssb-PositionsInBurst, which is part of ServingCellConfigCommon. The RRC ssb-PositionsInBurst for UEs connected to the gNB may result in 111111111111111111000000000000000000000000000000 000, whereas the RRC ssb-PositionsInBurst for UEs connected to the DR may result in 000000000000000000000000000000000111111100000000 0000000000000 000. According to certain example embodiments, for the ssb-PositionsInBurst for UEs connected to the gNB, the ssb-PositionsInBurst may indicate a time domain position of the SSB in a SSB burst. Specifically, the first left most bit may correspond to SS/PBCH index 0, the second left most bit may correspond to SS/PBCH index 1 and so on. Further, the $L_{max}$ parameter may define the maximum number of SSB transmission within the SSB burst, and it may depend on the carrier frequencies. In other example embodiments, for the RRC ssb-PositionsInBurst for UEs connected to the DR, the DR may be connected to one beam of the gNB.

Certain example embodiments may introduce a new approach in which the gNB will be allowed to use this command individually to configure UEs to listen to different parts of the SSB burst when also serving a DR, and that this command may be different from the ssb-PositionsInBurst used in SIB1. For instance, the SIB1 ssb-PositionsInBurst for all UEs may result in 111111111111111111111111111111111111111111111111 111. As such, according to certain example embodiments, all UEs connected to the DR in this scenario may be seen as being connected to the same gNB beam. However, in some cases, the gNB may need to be aware of this, which a gNB can determine by knowing the link budget to the DR, and reducing the power of the static SSBs send specifically to the DR. A UE may then receive the first SSB, in the SSB sweep pattern that covers the gNB cell, with higher power than those SSB beams intended for the DR. Additionally, if both the UE and the DR are at the cell edge, reducing the power of the SSB for the DR might not be an option, and the gNB may need to schedule a CSI-RS beam(s) for that SSB sector that is not repeated by the DR to determine if a UE is connected directly or via the DR.

According to certain example embodiments, in an IA, the DR may know the RO of the SSBs (the 7 communicated→ssb-PositionInBurst) used for sweeping within the DR sector, so it can configure the correct beam at the correct time to relay a preamble to the serving gNB. The gNB may then inform the DR (via new interface), which UE's within the sector of the SR has connected onto which ROs. In some example embodiments, the SR may listen for UE transmitted preambles when configuring beams for the different RO within its sector. The DR could then decode Msg2 transmitted from the gNB to the UEs in the sector of the DR, and thereby derive the needed information to link a specific UE to a specific DR beam. However, in some cases, the DR may not be able to configure the correct beam within its sector for a received Msg2, as the RF signal may be repeated, and the time needed to decode the Msg2 and configure the correct DR beam may be too long compared to the time it takes to repeat the RF signals (which may be in ps). As such, if this information is not communicated to the SR before the gNB sends Msg2, then that Msg2 may not reach the UE in the sector of the DR.

In certain example embodiments, for RRC, the UEs within the sector of the DR may regularly report the best SSBs (SSBRIs) seen from the UE, and the DR may relay this information to the serving gNB. Additionally, the gNB may then inform this to the DR (e.g., via new interface) for each UE within the sector of the DR. According to some example embodiments, the described method may be expanded to multiple DRs within the sector of the gNB, and DRs within the same SSB sector may share the same DR specific SSBs, for the gNB to limit the amount of SSBs used for DRs.

According to certain example embodiments, static SSB beams may include unique ROs and unique allocated preambles. For instance, according to some example embodiments, a unique RO may correspond to specific allocated physical resource blocks (PRBs). In addition, a unique preamble may correspond to a random selected preamble out of 64 pre-characterized preambles. In certain example embodiments, the physical random access channel (PRACH) may be designed to fit in the same bandwidth as 6 RBs of normal uplink (UL) transmission. Further, there may be 72×K subcarriers for the PRACH, specifically 864 for formats 0-3, and 144 for format 4. Additionally, the DR beam sweeping may repeat the static SSBs from the gNB, and there may be an DR RO beam configuration for IA. In other example embodiments, the gNB may inform the DR which UE in the sector of the DR has sent a preamble at which RO for IA. The gNB may also inform the DR which UE in the sector of the DR has sent a preamble allocated to a specific SSB for IA. In further example embodiments, the gNB may inform the DR which UE in the sector of the DR has reported which SSBRI as the best SSB for RRC. Moreover, the gNB may inform gNB-connected-UEs and DR-connected-UE to listen to different parts of the predefined SSB sequence. In some example embodiments, the gNB behavior may change to allow the gNB to use ssb-PositionInBurst in RRC to individually configure the UEs.

Figure 7:
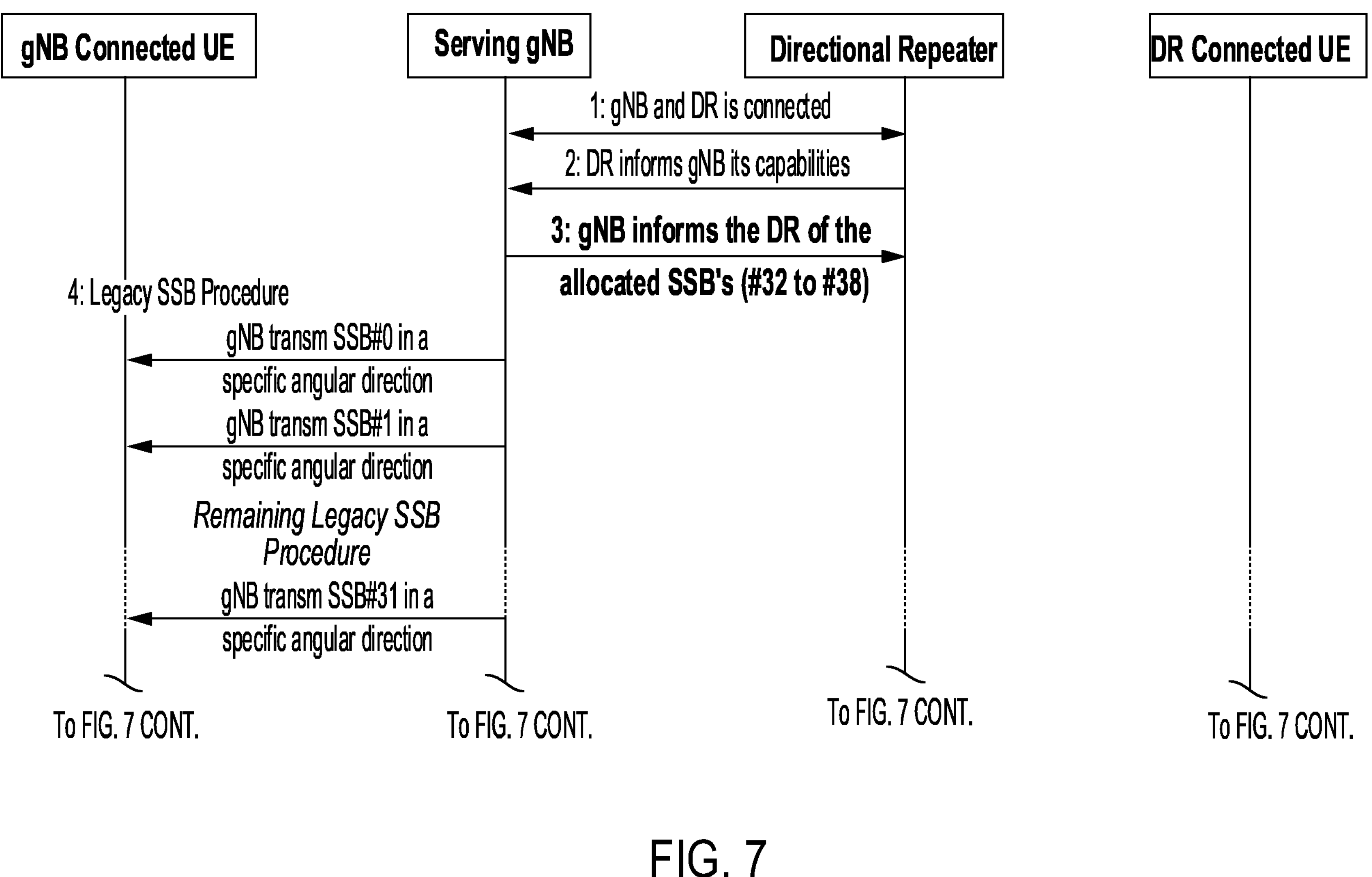
FIG. 7 illustrates an example signal flow diagram for IA, according to certain example embodiments.
Figure 7:
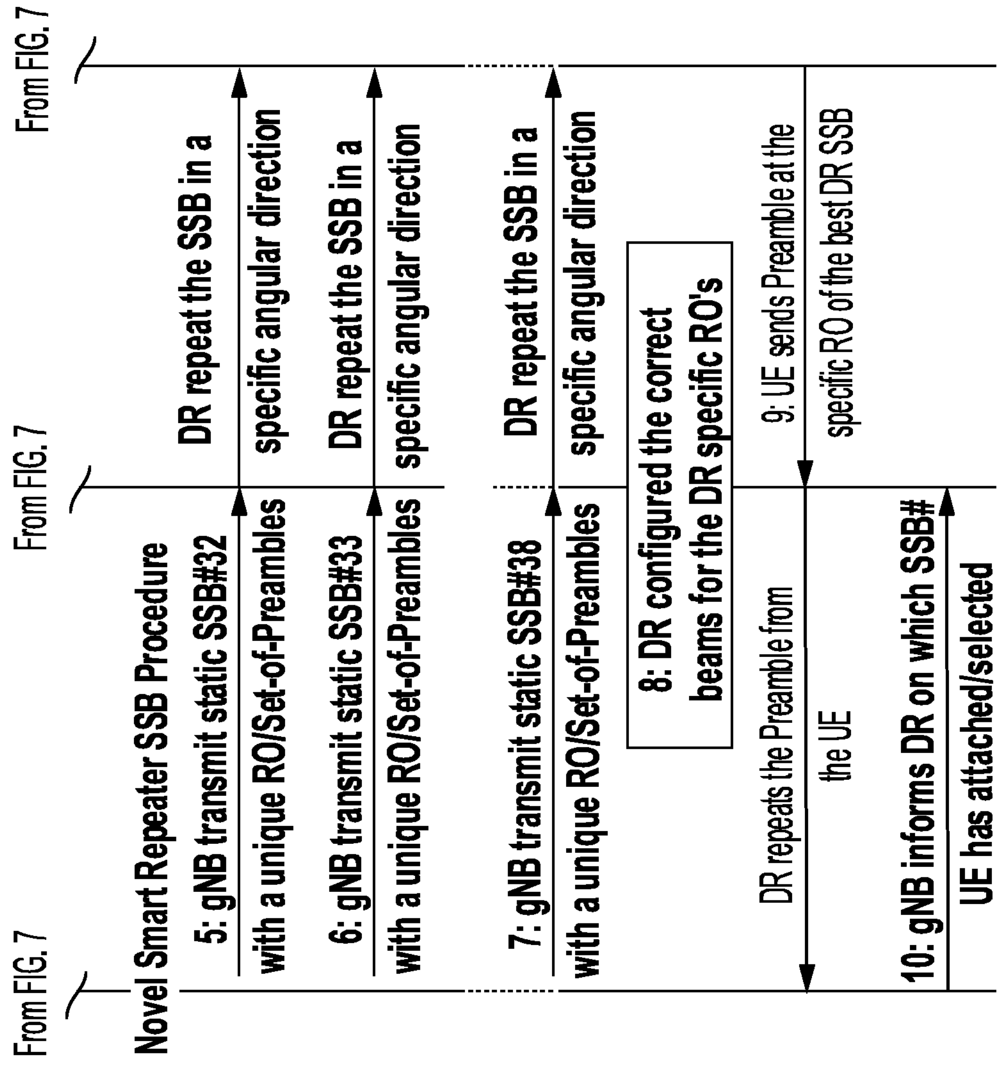

FIG. 7 illustrates an example signal flow diagram for IA, according to certain example embodiments. At 1, the DR may be connected to the gNB. As such, the gNB may be aware of a DR within its sector. Additionally, beam management between the gNB and the DR, which may act like a UE towards the gNB, may be handled by legacy 3GPP Rel-15 procedures. At 2, the DR may inform the gNB of its capabilities. For instance, in certain example embodiments, the capabilities may support different functionalities between frequency division duplex (FDD) and time division duplex (TDD), and/or between frequency range 1 (FR1) and frequency range 2 (FR2). At 3, the gNB may inform the DR of the specific SSBs allocated to the DR (e.g., SSBs (#32 to #38). Further, at 4, the gNB may perform the legacy SSB procedure toward the gNB connected UE. For instance, the gNB may transmit SSB #0 in a specific angular direction to the gNB connected UE, transmit SSB #1 in a specific angular direction to the gNB connected UE, and transmit SSB #31 in a specific angular direction to the gNB connected UE.

As further illustrated in FIG. 7, at 5, the gNB may transmit a static SSB #32 with a unique RO/set-of-Preambles to the DT, and the DR may repeat that static SSB in a unique angular direction to the DR connected UE. According to certain example embodiments, the static SSB #32 may correspond to one of the static SSB beams towards the DR in communication at operation 3 illustrated in FIG. 7. The static SSB in certain example embodiments may mean the same spatial filter at the gNB with the same transmit power level. The static SSB may also mean a consecutive repeated same SSB beam(s). At 6, the gNB may transmit a static SSB #33 with a unique RO/set-of-Preambles to the DR, and the DR may repeat that static SSB in a unique angular direction to the DR connected UE. Additionally, at 7, the gNB may transmit a static SSB #38 with a unique RO/set-of-Preambles to the DR, and the DR may repeat that static SSB in a unique angular direction to the DR connected UE. Although seven SSB beams are used in this example for one DR, the number of used SSBs may be more, less, or divided between multiple DRs in other example embodiments.

As also illustrated in FIG. 7, at 8, the DR may configure the correct received beams at the correct time for the gNB specified ROs. At 9, the DR connected UE may transmit to the DR its preamble at the specific resources allocated for the RO of the selected SSB. Additionally, the SR may repeat the preamble to the gNB. At 10, the gNB may inform the DR (via new DR interface), which UE has used which RO.

Figure 8:
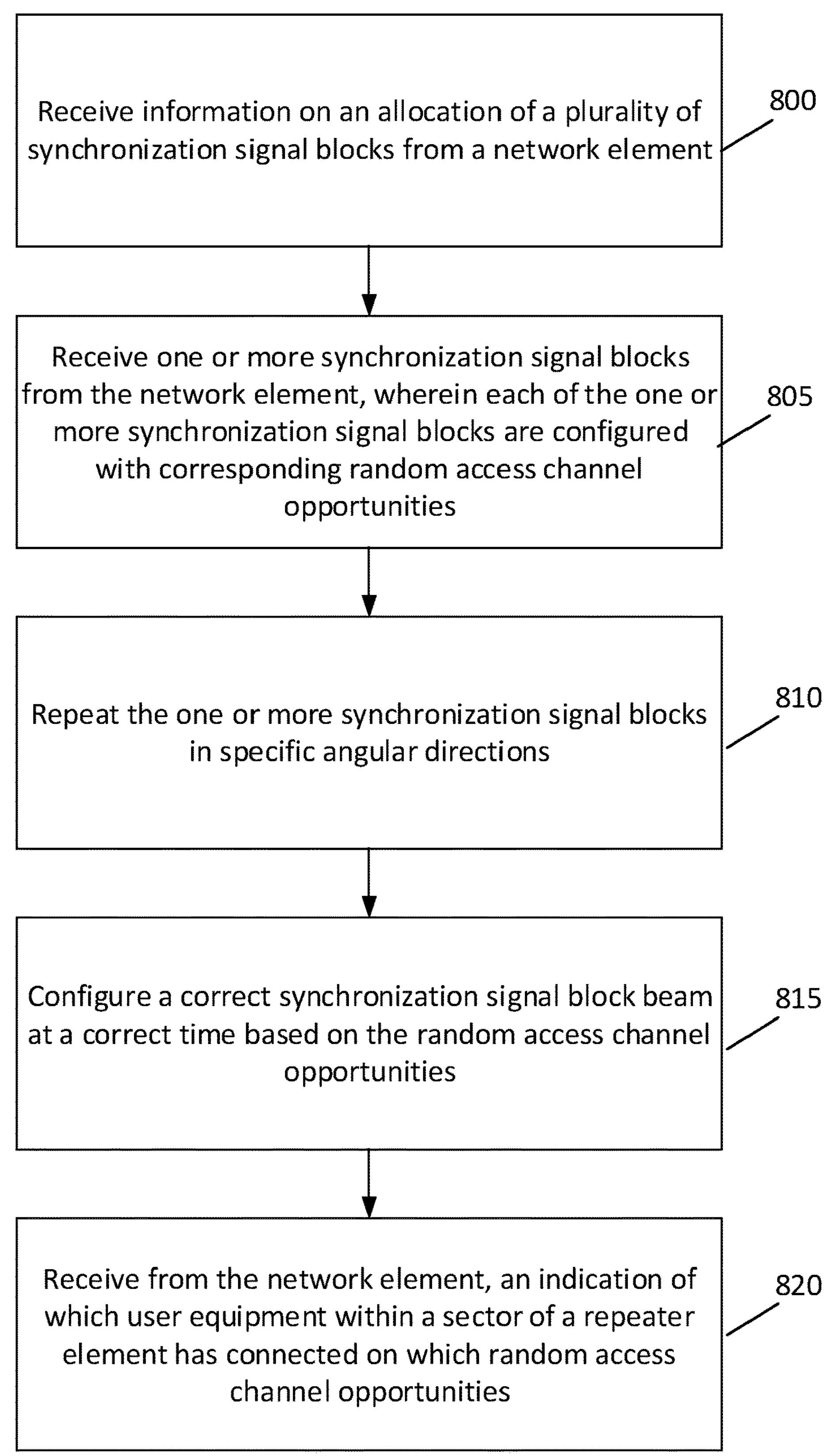
FIG. 8 illustrates a flow diagram of a method, according to certain example embodiments.

FIG. 8 illustrates a flow diagram of a method, according to certain example embodiments. In some example embodiments, the flow diagram of FIG. 8 may be performed by a telecommunications network entity or network node in a 3GPP system, such as LTE or 5G-NR. For instance, in certain example embodiments, the method of FIG. 8 may be performed by a directional repeater, for instance similar to apparatuses 10 or 20 illustrated in FIG. 10(*a*) or 10(*b*).

According to certain example embodiments, the method of FIG. 8 may include, at 800, receiving information on an allocation of a plurality of synchronization signal blocks from a network element. At 805, the method may include receiving one or more synchronization signal blocks from the network element. In certain example embodiments, the one or more synchronization signal blocks may be configured with corresponding random access channel opportunities. At 810, the method may include repeating the one or more synchronization signal blocks in specific angular directions. At 815, the method may include configuring a correct synchronization signal block beam at a correct time based on the random access channel opportunities. At 820, the method may include receiving from the network element, an indication of which user equipment within a sector of a repeater element has connected on which random access channel opportunities.

According to certain example embodiments, the method may also include receiving a preamble from a user equipment based on the correct synchronization signal block beam. In certain example embodiments, the preamble may be received at a specific resource allocated for the random access channel opportunities. According to some example embodiments, the one or more synchronization signal blocks may be configured with a set of allocated preambles. According to other example embodiments, the method may also include receiving an indication from the network element of which user equipment in the repeater element sector has reported a synchronization signal block indicator for radio resource control based on at least one of a reference signal received power, a signal-to-noise ratio, and a signal-to-noise and interference ratio. In certain example embodiments, the method may further include receiving an indication from the network element of which user equipment in the repeater element sector has transmitted a preamble allocated to a specific synchronization signal block for initial access. In other example embodiments, the method may also include performing, using the one or more synchronization signal blocks a synchronization signal block sweep within a sector covered by the repeater element.

Figure 9:
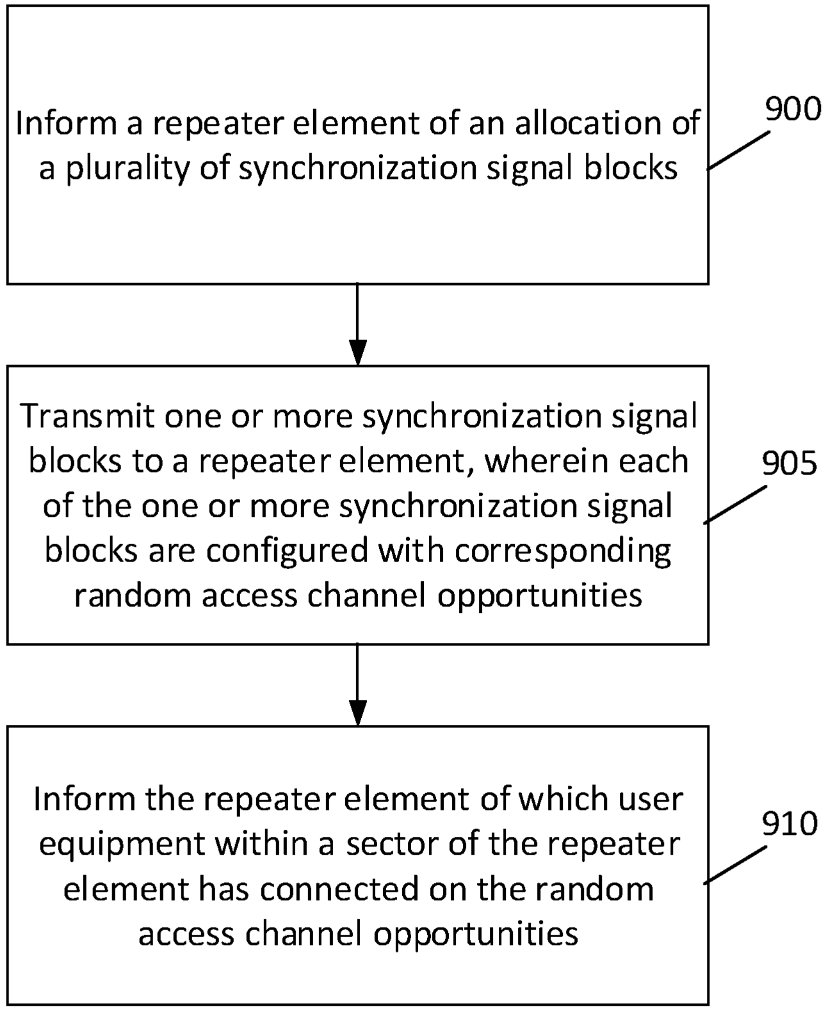
FIG. 9 illustrates a flow diagram of another method, according to certain example embodiments.

FIG. 9 illustrates a flow diagram of another method, according to certain example embodiments. In an example embodiment, the method of FIG. 9 may be performed by a telecommunications network entity or network node in a 3GPP system, such as LTE or 5G-NR. For instance, in certain example embodiments, the method of FIG. 10 may be performed by a gNB, for instance similar to apparatuses 10 or 20 illustrated in FIG. 10(*a*) or 10(*b*).

According to certain example embodiments, the method of FIG. 9 may include, at 900, informing a repeater element of an allocation of a plurality of synchronization signal blocks. At 905, the method may include transmitting one or more synchronization signal blocks to a repeater element. In certain example embodiments, the one or more synchronization signal blocks may be configured with corresponding random access channel opportunities. At 910, the method may include informing the repeater element of which user equipment within a sector of the repeater element has connected on the random access channel opportunities.

According to certain example embodiments, the method may also include informing the repeater element of which user equipment in the repeater element sector has reported a synchronization signal block indicator for radio resource control based on at least one of a reference signal received power, a signal-to-noise ratio, and a signal-to-noise and interference ratio. According to some example embodiments, the method may further include informing the repeater element of which user equipment in the repeater element sector has transmitted a preamble allocated to a specific synchronization signal block for initial access. According to other example embodiments, the method may include informing the repeater element of which user equipment in the repeater element sector has transmitted a preamble at the random access channel opportunities. In certain example embodiments, the method may also include configuring a user equipment in a sector of a network element, via radio resource control, to use a predefined set of synchronization signal blocks for beam management. In some example embodiments, the method may further include configuring a user equipment in a sector of a network element and another user equipment in a sector of the repeater element to listen to different parts of a pre-defined synchronization signal block sequence.

Figure 10A:
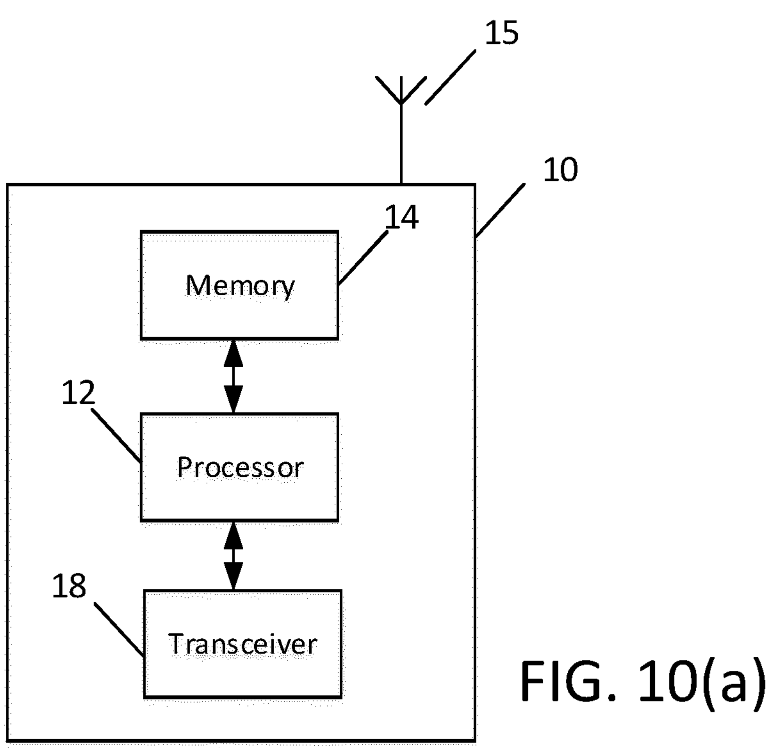
FIG. 10(*a*) illustrates an apparatus, according to certain example embodiments.
Figure 10B:
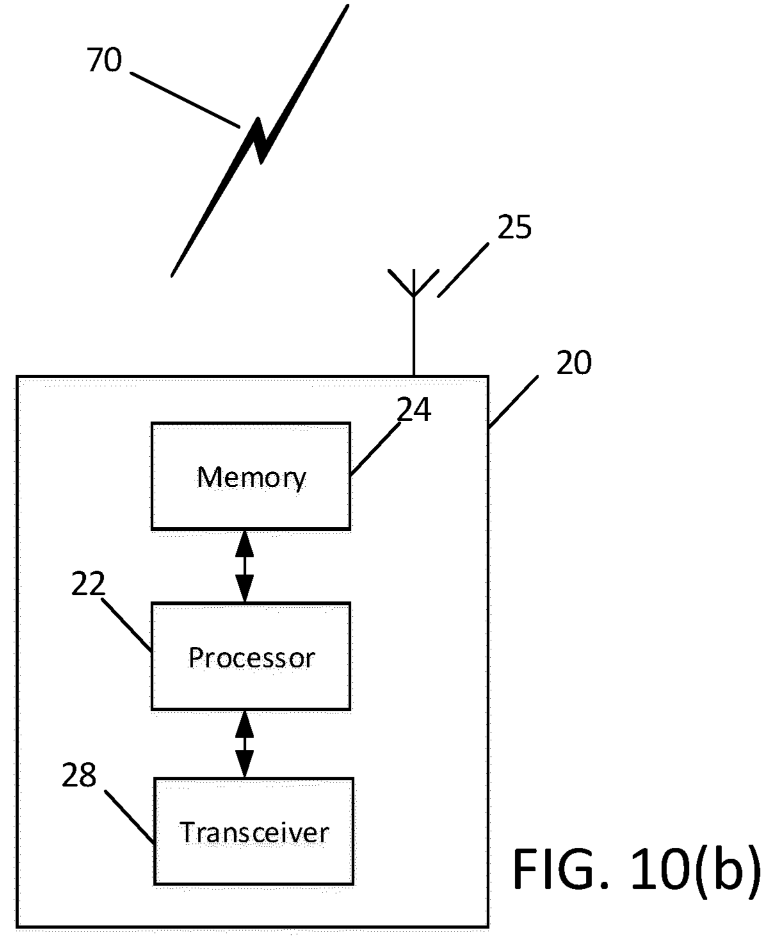

FIG. 10(*a*) illustrates an apparatus 10 according to certain example embodiments. In an embodiment, apparatus 10 may be a network element in a communications network or associated with such a network, such as a UE, directional repeater, or other similar device. It should be noted that one of ordinary skill in the art would understand that apparatus 20 may include components or features not shown in FIG. 10(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 10(*a*).

As illustrated in the example of FIG. 10(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors, DSPs, field-programmable gate arrays, FPGAs, application-specific integrated circuits, ASICs, and processors based on a multi-core processor architecture, as examples. While a single processor 12 is shown in FIG. 10(*a*), multiple processors may be utilized according to other embodiments. For example, it should be understood that, in certain example embodiments, apparatus 10 may include two or more processors that may form a multiprocessor system, for example in this case processor 12 may represent a multiprocessor, that may support multiprocessing. According to certain example embodiments, the multiprocessor system may be tightly coupled or loosely coupled, for example to form a computer cluster.

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory, RAM, read only memory, ROM, static storage such as a magnetic or optical disk, hard disk drive, HDD, or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-8.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface, for example, a modem, coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform, IFFT, module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a directional repeater for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive information on an allocation of a plurality of synchronization signal blocks from a network element. Apparatus 10 may also be controlled by memory 14 and processor 12 to receive one or more synchronization signal blocks from the network element. In certain example embodiments, the one or more synchronization signal blocks may be configured with corresponding random access channel opportunities. Apparatus 10 may further be controlled by memory 14 and processor 12 to repeat the one or more synchronization signal blocks in specific angular directions. In addition, apparatus 10 may be controlled by memory 14 and processor 12 to configure a correct synchronization signal block beam at a correct time based on the random access channel opportunity. Further, apparatus 10 may be controlled by memory 14 and processor 12 to receive from the network element, an indication of which user equipment within a sector of a repeater element has connected on the random access channel opportunities.

FIG. 10(*b*) illustrates an apparatus 20 according to certain example embodiments. In an example embodiment, the apparatus 20 may be a network element in a communications network or associated with such a network, such as a gNB, or other similar device. It should be noted that one of ordinary skill in the art would understand that apparatus 20 may include components or features not shown in FIG. 10(*b*).

As illustrated in the example of FIG. 10(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, DSPs, FPGAs, ASICs, and processors based on a multi-core processor architecture, as examples. While a single processor 22 is shown in FIG. 10(*b*), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7 and 9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of RAM, ROM, static storage such as a magnetic or optical disk, HDD, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7 and 9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, RFID, UWB, MulteFire, and the like. The radio interface may include components, such as filters, converters (for example, digital-to-analog converters and the like), mappers, a FFT module, and the like, to generate symbols for a transmission via one or more downlinks and to receive symbols, for example, via an uplink.

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations, for example analog and/or digital circuitry, combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a be a network element, a node, host, or server in a communication network or serving such a network. For example, apparatus 20 may be a gNB, or other similar device associated with a RAN, such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to inform a repeater element of an allocation of a plurality of synchronization signal blocks. Apparatus 20 may also be controlled by memory 24 and processor 22 to transmit one or more synchronization signal blocks to a repeater element. In certain example embodiments, the one or more synchronization signal blocks may be configured with corresponding random access channel opportunities. In addition, apparatus 20 may be controlled by memory 24 and processor 22 to inform the repeater element of which user equipment within a sector of the repeater element has connected on the random access channel opportunities.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Further example embodiments may provide means for performing any of the functions or procedures described herein. For example, certain example embodiments may be directed to an apparatus that includes means for receiving information on an allocation of a plurality of synchronization signal blocks from a network element. The apparatus may also include means for receiving one or more synchronization signal blocks from a network element. In certain example embodiments, the one or more synchronization signal blocks may be configured with corresponding random access channel opportunities. The apparatus may further include means for repeating the one or more static synchronization signal blocks in specific angular directions. In addition, the apparatus may include means for configuring a correct synchronization signal block beam at a correct time based on the random access channel opportunities. Further, the apparatus may include means for receiving from the network element, an indication of which user equipment within a sector of a repeater element has connected on which random access channel opportunities.

Other example embodiments may be directed to a further apparatus that includes means for informing a repeater element of an allocation of a plurality of synchronization signal blocks. The apparatus may also include means for transmitting one or more synchronization signal blocks to a repeater element. In certain example embodiments, the one or more synchronization signal blocks are configured with corresponding random access channel opportunities. The apparatus may further include means for informing the repeater element of which user equipment within a sector of the repeater element has connected on the random access channel opportunity.

Certain example embodiments described herein provide several technical improvements, enhancements, and/or advantages. In some example embodiments, it may be possible to enable DRs to utilize the current 3GPP Rel-15 specified SSB pattern to perform a SSB sweep in its own sector. According to some example embodiments, this may be achieved by adding an information element in the definition of the SSB pattern. Further, certain example embodiments may provide coverage enhancements, especially from outdoor to indoor scenarios.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit, ASIC, a programmable gate array, PGA, a field programmable gate array, FPGA, or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation, 4G, technology.

Partial Glossary

3GPP 3$^{rd}$ Generation Partnership Project
4G 4$^{th}$ Generation Wireless Technology
5G 5$^{th}$ Generation Wireless Technology
CP Control Plane
DL Downlink
DR Directional Repeater
DU Distributed Unit
eNB Enhanced Node B
FDD Frequency Division Duplexing
FR1 Frequency Range 1
FR2 Frequency Range 2
gNB 5G or NR Base Station
HW Hardware
IA Initial Access
IAB Integrated Access and Backhaul
LTE Long Term Evolution MIB Master Information Block
MIMO Multiple Input Multiple Output
mm Wave Millimeter Wave
MT Mobile Terminal
NR New Radio
PDCP Packet Data Convergence Protocol
RACH Random Access Channel
RO RACH Opportunities
RRC Radio Resource Control
SCS Sub-Carrier-Spacings
SIB Signal Information Block
SSB Synchronization Signal Block
SSBRI SSB Resource Block Indicators
TDD Time Division Duplexing
UE User Equipment
UL Uplink
UP User Plane

We claim:

1. An apparatus, comprising:
at least one processor; and
at least one memory comprising computer program code,
the at least one memory and the computer program code are configured, with the at least one processor to cause the apparatus at least to;
receive information on an allocation of a plurality of synchronization signal blocks from a network element;
receive one or more synchronization signal blocks from the network element, wherein the one or more synchronization signal blocks are configured with corresponding random access channel opportunities,
wherein each of the one or more synchronization signal blocks are configured with a unique set of allocated preambles and a unique random access channel opportunity corresponding to specific allocated physical resource blocks,
wherein the one or more synchronization signal blocks comprise repeated synchronization signal blocks corresponding to a same synchronization signal block beam transmitted from the network element and received with a highest reference signal received power, signal-to-noise ratio, and signal-to-noise and interference ratio;
perform, using the one or more synchronization signal blocks, a synchronization signal block sweep within a sector covered by a repeater element,
wherein performing the synchronization signal block sweep comprises using synchronization signal blocks corresponding to a second portion of a synchronization signal block burst that is different from a first portion used for legacy beam sweeping by the network element,
wherein performing the synchronization signal block sweep comprises using a subset of the one or more synchronization signal blocks that are allocated to the repeater element and repeating a same synchronization signal block beam for sweeping within the sector covered by the repeater element;
repeat the one or more synchronization signal blocks in specific angular directions,
wherein repeating the one or more synchronization signal blocks comprises repeating static synchronization signal blocks using a same spatial filter and same transmit power level in consecutive repeated synchronization signal block beams;
configure a correct synchronization signal block beam at a correct time based on the random access channel opportunities,
wherein configuring the correct synchronization signal block beam comprises configuring a beam corresponding to a random access channel opportunity timing indicated by a ssb-PositionsInBurst configuration received from the network element;
receive a preamble from a user equipment based on the correct synchronization signal block beam,
wherein the preamble is received at a specific resource allocated for the random access channel opportunities;
receive from the network element, an indication of which user equipment within the sector of the repeater element has connected on which random access channel opportunities;
receive an indication from the network element of which user equipment in the sector of the repeater element has reported a synchronization signal block indicator for radio resource control based on a reference signal received power, a signal-to-noise ratio, and a signal-to-noise and interference ratio; and
receive an indication from the network element of which user equipment in the sector of the repeater element has transmitted a preamble allocated to a specific synchronization signal block for initial access.

* * * * *